United States Patent
Li et al.

(10) Patent No.: US 7,974,107 B2
(45) Date of Patent: Jul. 5, 2011

(54) SYSTEM AND METHOD FOR CONTROLLING A CURRENT LIMIT WITH PRIMARY SIDE SENSING USING A HYBRID PWM AND PFM CONTROL

(75) Inventors: Yong Li, Campbell, CA (US); Junjie Zheng, Santa Clara, CA (US); Liang Yan, Campbell, CA (US); John Kesterson, San Jose, CA (US); Xiao Yan Wang, Pleasanton, CA (US)

(73) Assignee: iWatt Inc., Los Gatos, CA (US)

( * ) Notice: Subject to any disclaimer, the term of this patent is extended or adjusted under 35 U.S.C. 154(b) by 541 days.

(21) Appl. No.: 12/199,471

(22) Filed: Aug. 27, 2008

(65) Prior Publication Data
US 2009/0059632 A1 Mar. 5, 2009

Related U.S. Application Data

(60) Provisional application No. 60/968,539, filed on Aug. 28, 2007.

(51) Int. Cl.
*H02M 3/335* (2006.01)
(52) U.S. Cl. ............... 363/21.01; 363/21.08; 363/21.16; 363/21.12
(58) Field of Classification Search ............... 363/18, 363/20, 21.01, 21.04, 21.05, 21.08, 21.09, 363/21.1, 21.11, 21.12, 21.13, 21.17, 21.18; 323/282, 283
See application file for complete search history.

(56) References Cited

U.S. PATENT DOCUMENTS

| 4,800,328 | A | 1/1989 | Bolger et al. | |
|---|---|---|---|---|
| 7,492,619 | B2 * | 2/2009 | Ye et al. | 363/97 |
| 2005/0162874 | A1 * | 7/2005 | Umetsu | 363/37 |
| 2007/0164720 | A1 | 7/2007 | Lalithambika et al. | |
| 2008/0259652 | A1 * | 10/2008 | Huynh et al. | 363/21.12 |
| 2010/0046258 | A1 * | 2/2010 | Coulson et al. | 363/95 |

OTHER PUBLICATIONS

PCT International Search Report and Written Opinion, PCT/US08/74457, Nov. 3, 2008, 8 Pages.

* cited by examiner

*Primary Examiner* — Adolf Berhane
*Assistant Examiner* — Nguyen Tran
(74) *Attorney, Agent, or Firm* — Fenwick & West LLP

(57) ABSTRACT

A hybrid constant current control system that uses both pulse width modulation (PWM) and pulse frequency modulation (PFM) control. When transitioning from constant voltage mode to constant current mode the present invention can continue to control using PWM. Thereafter, when the voltage has dropped, the present invention smoothly transitions to PFM mode. The point of transition is based upon the switching frequency and the lowest rated voltage of operation. The system and method avoids very short (narrow) Ton times which ensures accurate constant current (CC) control with bipolar junction transistor (BJT) devices. The present invention also avoids acoustic noise because the switching frequency is maintained at a high enough level to avoid such acoustic noise even when the energy transferred through the transformer is still substantial and the output voltage is not too low. In addition the output current limit is insensitive to variation in the inductance-input voltage ratio, and is minimized against leakage inductance.

12 Claims, 3 Drawing Sheets

US 7,974,107 B2

SYSTEM AND METHOD FOR CONTROLLING A CURRENT LIMIT WITH PRIMARY SIDE SENSING USING A HYBRID PWM AND PFM CONTROL

RELATED APPLICATIONS

This application claims priority from U.S. provisional application No. 60/968,539 filed on Aug. 28, 2007 which is incorporated by reference herein in its entirety.

FIELD OF THE INVENTION

The invention relates generally to power supply controllers and more particularly to hybrid controllers for power supplies using both pulse width modulation (PWM) and pulse frequency modulation (PFM).

BACKGROUND OF THE INVENTION

Conventional power supply controllers use metal-oxide semiconductor field-effect transistor (MOSFET) transistors as switches such as, for example, U.S. Pat. No. 6,972,969, U.S. patent application Ser. No. 11/745,299 filed on May 7, 2007 and U.S. patent application Ser. No. 11/558,326 filed on Nov. 9, 2006 which are incorporated by reference herein in their entirety.

However, the output current limit control techniques used in conventional systems can not be directly used when a bipolar junction transistor (BJT) switching device is used instead of a MOSFET switching device, and when the pulse width modulation (PWM) switching frequency is relatively high, such as 65 kilohertz (kHz) and above. If the PWM control is used for a wide range of the constant current (CC) mode, which has fixed PWM switching period, in order to maintain the constant output current, then when the output voltage is reduced (from 5 volts (V) towards 1V for example), the switch's ON time (Ton) is reduced accordingly. As a consequence, when the output voltage is low, the Ton time can become very small. For power MOSFET's which typically have short turn-on and turn-off times, this is typically not a problem. However, when a BJT is used, the very-narrow Ton time can cause control problems and degrade the control accuracy of the CC current limit, because the BJT's normally have much longer turn-on and turn-off times which can be dynamically changed with line voltage and load. Furthermore, because of the longer turn-on time, this effectively becomes a minimum Ton time. This minimum Ton time requirement also affects the digital control resolution requirements.

Another conventional CC control technique is accomplished by using constant current (CC) Pulse-Frequency-Modulation (PFM) control. By using the PFM for the CC control, the Ton time is substantially fixed, and the switching period is gradually increased when the output voltage is reduced. In this CC PFM control technique, the output current can still be controlled constantly, without causing the problem of having a very-narrow (short) Ton time. A problem with conventional constant current PFM control, however, is that when there is still significant energy being transferred from the transformer primary side to the secondary side, the switching frequency can be reduced to a level that results in sounds that can be heard by humans, such as below approximately 30 kHz with a constant current voltage of approximately 1 ampere (A) when the output voltage is above 1V. This kind of acoustic noise is not acceptable in some applications such as chargers, and it requires special process during transformer manufacturing to eliminate the noise which increases the cost and complexity.

SUMMARY OF THE INVENTION

The present invention is a hybrid constant current control system that uses both pulse width modulation (PWM) and pulse frequency modulation (PFM) control. When transitioning from constant voltage mode to constant current mode the present invention can continue to control using PWM. Thereafter, when the voltage has dropped, the present invention smoothly transitions to PFM mode. The point of transition is based upon the switching frequency and the lowest rated voltage of operation.

The present invention avoids very short (narrow) Ton times which ensures accurate constant current (CC) control with bipolar junction transistor (BJT) devices. The present invention also avoids acoustic noise because the switching frequency is maintained at a high enough level to avoid such acoustic noise even when the energy transferred through the transformer is still substantial and the output voltage is not too low (for example, a switching frequency of 30 kHz when the output voltage is above 1 volt). In addition the output current limit is insensitive to variation in the inductance-input voltage ratio (Lm/Vin), and is minimized against leakage inductance.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION OF THE INVENTION

A preferred embodiment of the present invention is now described with reference to the figures where like reference numbers indicate identical or functionally similar elements. Also in the figures, the left most digits of each reference number corresponds to the figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

Figure 1:
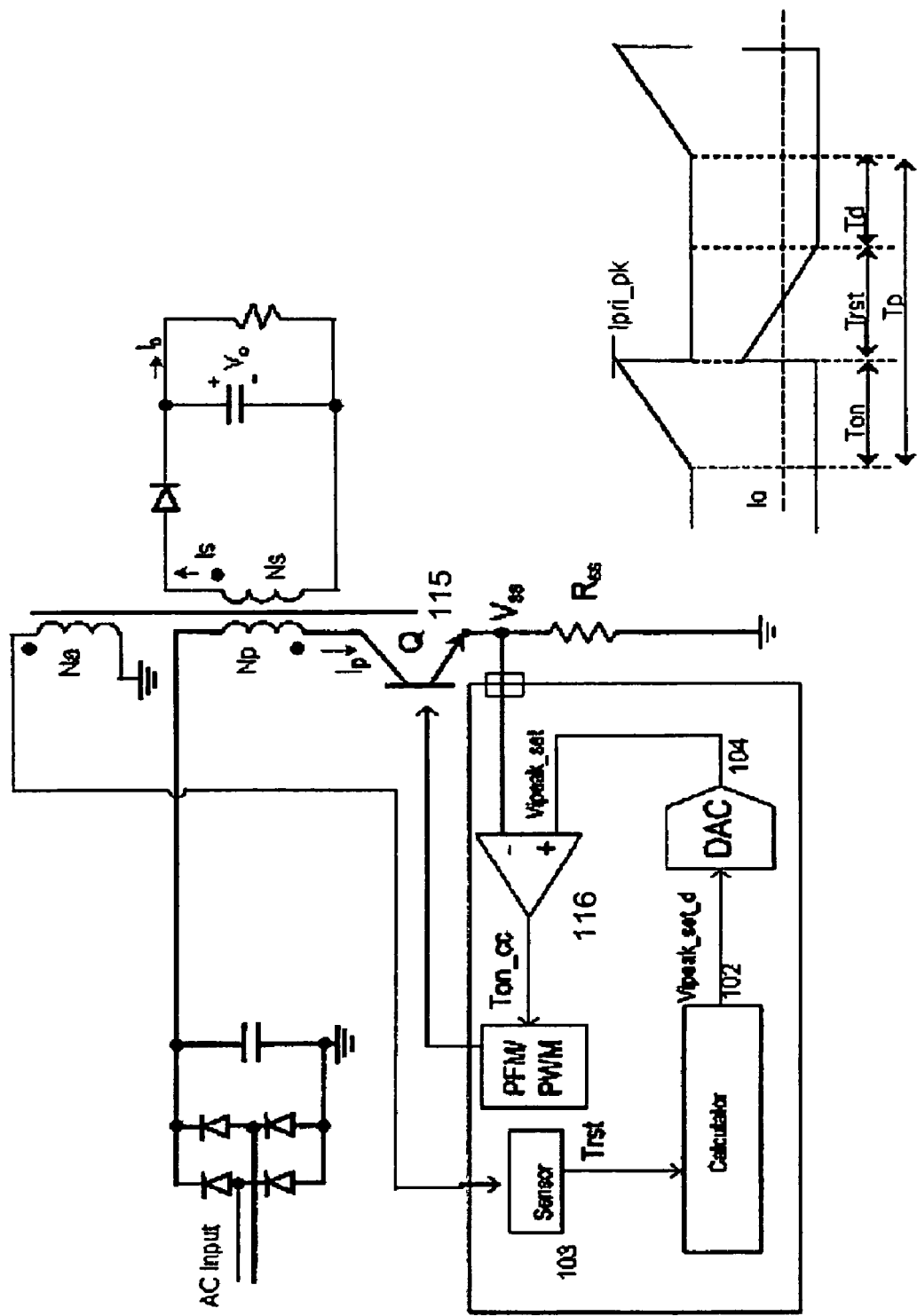
FIG. 1 is an illustration of a circuit in which one embodiment of the present invention operates.
Figure 2:
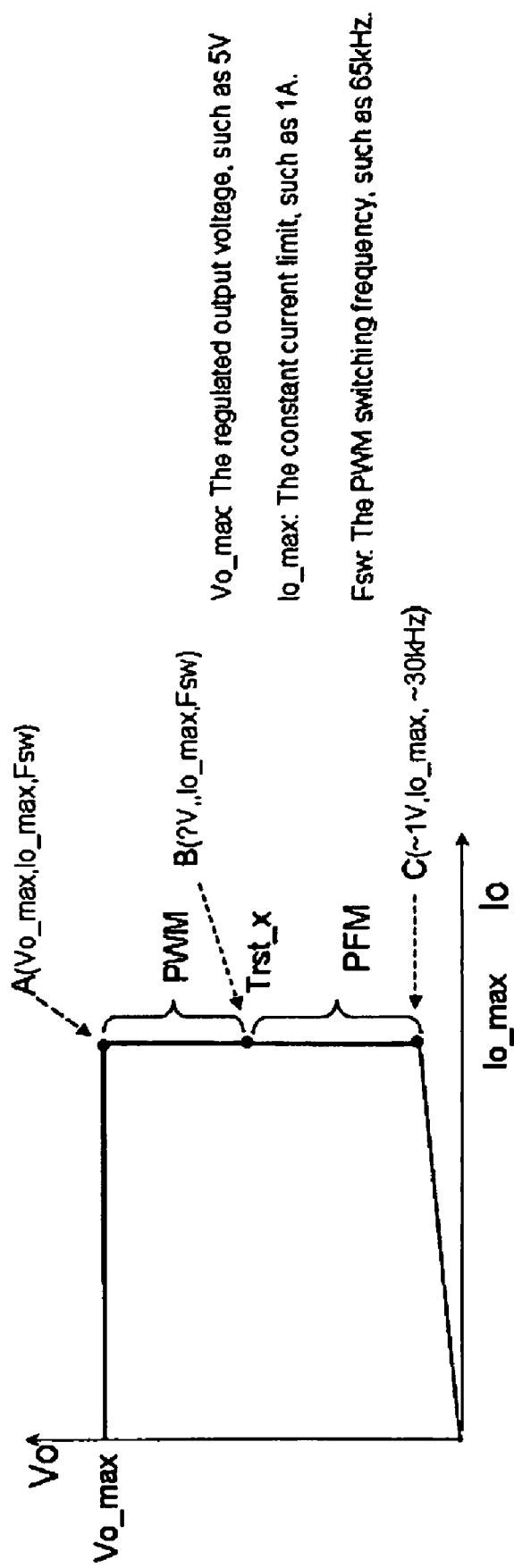
FIG. 2 is an illustration of a Voltage-Current graph that shows how one embodiment of the present invention operates.
Figure 3:
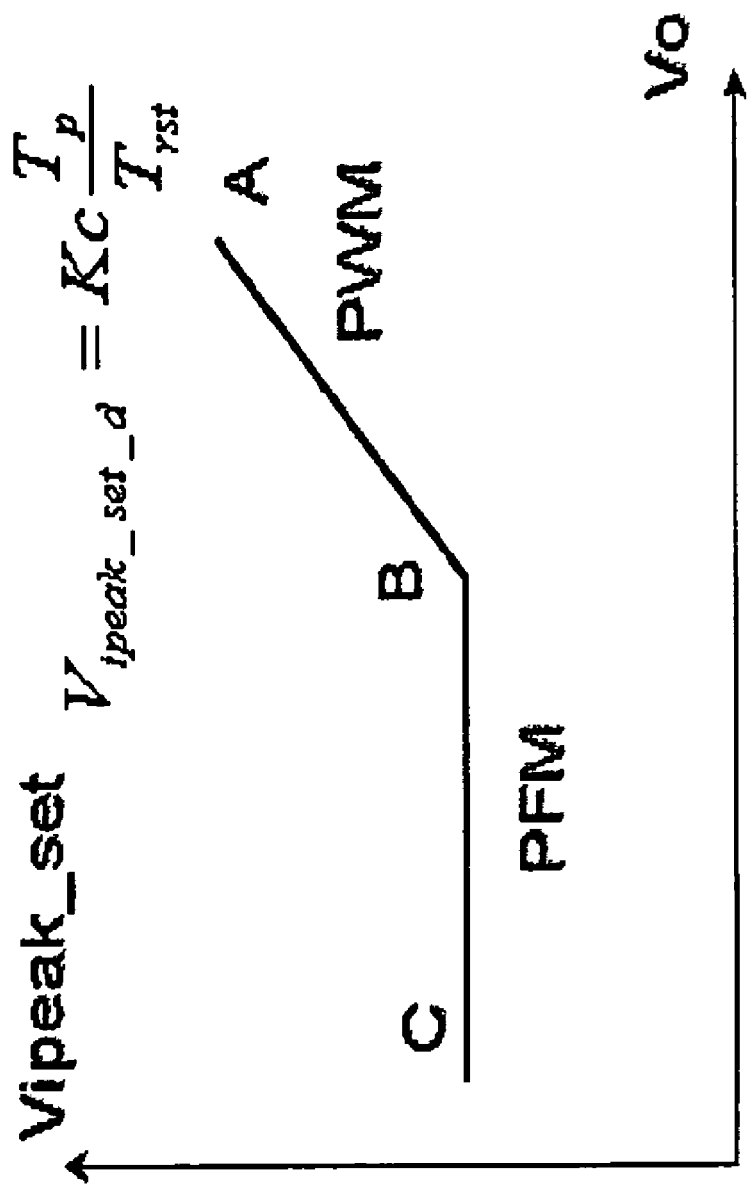
FIG. 3 is an illustration of a peak voltage verses output voltage graph that shows how one embodiment of the present invention operates.

FIGS. 1-3 illustrate the concept of the hybrid constant current pulse width modulation, pulse frequency modulation (CC PWM/PFM) control method in accordance with one embodiment of the present invention. FIG. 1 is an illustration of a circuit in which one embodiment of the present invention operates. FIG. 2 is an illustration of a Voltage-Current graph that shows how one embodiment of the present invention operates. FIG. 3 is an illustration of a peak voltage verses output voltage graph that shows how one embodiment of the present invention operates.

In the output voltage-current (VI) curve illustrated in FIG. 2, point A is the constant voltage (CV) to constant current (CC) transition point. At point A the output voltage Vo is equal to the regulated voltage Vo_max (such as 5V), the output current reaches the output current limit Io_max (such as 1 amp (A)), and the switching frequency equals the PWM frequency (such as 65 kHz). It is envisioned that other PWM frequencies can be used. In one embodiment of the present invention, along the constant current (CC) curve (between points A and C in FIG. 2 and FIG. 3), when the output voltage (Vo) deceases between point A to point B, the power converter operates in the pulse width modulation constant current (PWM CC) mode, which enables the switching frequency to maintain the same frequency as the PWM frequency (such as 65 kHz) and the output current, Io, is maintained at the CC limit (such as 1 A). In addition, the transformer reset time (Trst) increases, and the primary peak current (Ipri_pk) decreases. The transformer reset time Trst is the reset time for the secondary winding of the transformer. That is, the reset time is the duration of the current pulse on the secondary side, e.g., the time for the magnetic field of the secondary winding to collapse. As described in more detail below, the transformer reset time Trst is measured in real-time by means of auxiliary transformer winding Na. In one embodiment the Trst sensor 103 using a digital counter, for example, to measure the value of Trst and this measured value is used during a subsequent cycle to calculate the switching period (Tp) and the comparator threshold (Vipeak_set). This is accomplished by changing the comparator threshold Vipeak_set, which is dynamically controlled via the digital-to-analog converter DAC 104, the Trst sensor 103 and Vipeak Calculator 102 as shown in FIG. 1. Additional details about Vipeak_set are set forth below.

At point B, the mode of operation is transitioned from pulse width modulation constant current mode (PWM CC) to pulse frequency modulation constant current mode (PFM CC). This transition is accomplished by detecting the value of the reset time (Trst) and using the criteria that Trst increases to certain defined value (Trst_x) in order to maintain a constant current. In FIG. 2, point B is labeled as B (?V, Io_max, Fsw) where the question mark "?" represents that at point B, the transition criteria is primarily based on Trst. For example, if Trst>Trst_x, then the system moves to PFM CC control and if Trst<Trst_x, then PWM CC control continues. So the output voltage Vo at this point is not predefined, and may change with different transformer designs such as the inductance (Lm) and primary to secondary winding turns ratio. For example power supply operations can be described using equations (1a-1c).

$$V_{in}T_{on} \cdot \eta_x = N_{ps} \cdot V_o \cdot T_{rst} \tag{1a}$$

$$P_o = \frac{1}{2} \frac{(V_{in}T_{on})^2}{L_m} \cdot F_{sw} \cdot \eta_s \tag{1b}$$

$$P_o = V_o \cdot I_o \tag{1c}$$

where, $\eta_x$ is the transformer transfer efficiency, typically around 85% to 90%, $\eta_s$, is the power supply efficiency, typically around 70%, $P_o$ is the output power, and $F_{sw}$ is the switching frequency. Solving equations 1a-1c determines the $V_o$, as shown in Equation (1d).

$$V_o = \frac{2 \cdot L_m \cdot \eta_x^2 \cdot I_o}{N_{ps}^2 \cdot T_{rst}^2 \cdot \eta_s \cdot F_{sw}} \tag{1d}$$

At the PWM_CC to PFM_CC transition point, Trst and Fsw are known as Trst=Trst_x, Fsw=Fsw_PWM (such as 65 kHz). In addition the output current (Io) is controlled, such as Io=1 A. Therefore, Vo_x is affected by Lm and N.

From point B to point C in FIG. 2, the power converter is in the PFM CC mode, where the switching frequency decreases, the primary peak current, Ipri_pk, and the output current are kept constant, and the output voltage, Vo, decreases. This is accomplished by increasing the switching period (Tp) based upon the reset time as shown in equation (2).

$$Tp=Kp*Trst \tag{2}$$

where Kp is a constant, and Vipeak_set is fixed to a constant (see additional details below). The control is designed in such as way that when at point C (about 1V output in this example), the switching frequency is still higher than 30 kHz. The value of the primary peak current Ipri_pk is shown in equation (3).

$$Ipri\_pk=(2*Io*Tp)/Nps*Trst) \tag{3}$$

where Nps is equal to the ratio of the primary winding turns to the secondary winding turns.

In the system architecture, one embodiment of which is shown in FIG. 1, the circuit is a flyback power converter with a transformer which has at least three windings: primary winding Np, secondary winding Ns, and auxiliary winding Na, with Q (115) being a BJT switching device. There is a current sensing resistor Rss that is in series with Q (115), and the Rss sense pin provides information on the primary peak current Ipri_pk which is used to estimate the output current Io. The transformer reset time Trst is measured real-time by means of auxiliary transformer winding Na and the Trst sensor. For example the Trst sensor 103 can be a counter that is used to count the duration of the current pulse on the secondary side, e.g., the time for the magnetic field of the secondary winding to collapse time. An example of such a counter is described in U.S. patent application Ser. No. 11/558,326, referenced above. The digital logic in the calculator 102 dynamically changes the Vipeak_set based on the switching period Tp and transformer reset time Trst, by calculating Vipeak_set_d based upon equation (4).

$$Vipeak\_set\_d = Kc*Tp/Trst \quad (4)$$

where Kc is a constant and is equal to the value set forth in equation (5).

$$Kc = (2*Io\_cc\_k*Rss\_k)/(Nsp\_k) \quad (5)$$

where Io_cc_k is equal to 1 A, Rss_k is equal to 2.78 ohms and Nsp_k is equal to 14.5 in accordance with one example. These values can differ, e.g., if a different circuit or different values, e.g., constant current, are used. It will be apparent that if any of these values is different than the example above then the value of the constant Kc will also differ.

The DAC converts the digital Vipeak_set_d to analog signal Vipeak_set to serve as the threshold of the Isense comparator 116. Once the voltage drop across the Rss sense resistor reaches the threshold, the switch turns off.

The transition between PWM and PFM depends on Trst value cycle by cycle. If $T_{rst} > T_{rst\_x}$ then control is accomplished using pulse frequency modulation (PFM). If $T_{rst} < T_{rst\_x}$ then control is accomplished using pulse width modulation (PWM). The typical operation using PWM and PFM is known.

For example, the CC (constant current) mode control is to maintain the output current Io constant. From the basic power supply operation point of view, the To, which is the average value of the secondary current Isec over the switching cycles, is determined by Equation (6).

$$I_o = \frac{1}{2} I_{sec\_pk} \cdot \frac{T_{rst}}{T_P} \quad (6)$$

where Isec_pk is the peak value of the secondary current, and the secondary current decreases to zero in triangle manner within Trst, as shown in FIG. 1. To maintain the Io constant, there are at least two options. The first option is to keep Isec_pk constant, and keep the ratio of Trst/Tp constant—this is PFM control, which changes the Tp based on the measured Trst while keeps Vipeak_set_d constant, by setting Vipeak_d_set as per Equation (7).

$$V_{ipeak\_d\_set} = K_c \cdot \frac{T_P}{T_{rst}} \quad (7)$$

Another option is to keep Tp constant, and keep the product of Isec_pk*Trst constant—this is PWM control, which keep constant period for PWM control, and set (Isec_pk*Trst) as per Equation (8).

$$I_{sec\_pk} \cdot T_{rst} = \frac{V_{ipeak\_set}}{R_{ss}} \cdot N_{ps} \cdot \eta_x \cdot T_{rst} \propto K_c \cdot \frac{T_P}{T_{rst}} \cdot \frac{1}{R_{ss}} \cdot$$

$$N_{ps} \cdot \eta_x \cdot T_{rst}$$

$$= \frac{K_c \cdot T_P \cdot N_{ps} \cdot \eta_x}{R_{ss}} \quad (8)$$

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention.

The invention claimed is:

1. A method for limiting an output current of a power supply over multiple switching cycles in a constant current mode using pulse width modulation (PWM) and pulse frequency modulation (PFM), said power supply having a primary and secondary side and a bipolar junction transistor (BJT) as switching device, the method comprising the steps of:
   generating a sense voltage signal on the primary side that is proportional to an output voltage signal on the secondary side;
   measuring a reset time on the primary side using said sense voltage signal, said reset time representing a duration of a current pulse on the secondary side;
   generating a digital feedback voltage signal to maintain a substantially constant current on the secondary side using pulse width modulation (PWM) control when said reset time is lower than a first control value, said digital feedback voltage signal representing the on-time for a subsequent switching cycle of the BJT switching device; and
   generating a digital feedback voltage signal to maintain a substantially constant current on the secondary side using pulse frequency modulation (PFM) control when said reset time is not lower than said first control value, said digital feedback voltage signal representing the duration of said subsequent switching cycle of the BJT switching device.

2. The method of claim 1, wherein said first control value is determined based upon a duration of the switching cycle and a rated voltage of operation of the power supply.

3. The method of claim 1, wherein said pulse frequency modulation (PFM) control prevents an audible sound during the switching cycle of the BJT switching device.

4. The method of claim 1, wherein the output current limit is insensitive to variation in the inductance-input voltage ratio.

5. A system for limiting an output current of a power supply over multiple switching cycles in a constant current mode using pulse width modulation (PWM) and pulse frequency modulation (PFM), comprising:
   a transformer having a primary side winding and a secondary side winding;
   a bipolar junction transistor (BJT) as switching device;
   sense voltage generator for generating a sense voltage signal on the primary side of the power supply that is proportional to an output voltage signal on the secondary side;

reset means for measuring a reset time on the primary side using said sense voltage signal, said reset time representing a duration of a current pulse on the secondary side;

PWM control means for generating a digital feedback voltage signal to maintain a substantially constant current on the secondary side using pulse width modulation (PWM) control when said reset time is lower than a first control value, said digital feedback voltage signal representing the on-time for a subsequent switching cycle of the BJT switching device; and PFM control means for generating a digital feedback voltage signal to maintain a substantially constant current on the secondary side using pulse frequency modulation (PFM) control when said reset time is not lower than said first control value, said digital feedback voltage signal representing the duration of said subsequent switching cycle of the BJT switching device.

6. The system of claim 5, wherein said first control value is determined based upon a duration of the switching cycle and a rated voltage of operation of the power supply.

7. The system of claim 5, wherein said pulse frequency modulation (PFM) control prevents an audible sound during the switching cycle of the BJT switching device.

8. The system of claim 5, wherein the output current limit is insensitive to variation in the inductance-input voltage ratio.

9. A system for limiting an output current of a power supply over multiple switching cycles in a constant current mode using pulse width modulation (PWM) and pulse frequency modulation (PFM), comprising:

a transformer having a primary side winding and a secondary side winding;

a bipolar junction transistor (BJT) as switching device;

sense voltage generator for generating a sense voltage signal on the primary side of the power supply that is proportional to an output voltage signal on the secondary side;

reset means for generating a reset signal representing a measured reset time on the primary side using said sense voltage signal, said reset time representing a duration of a current pulse on the secondary side;

a constant current controller, disposed to receive said reset signal, said constant current controller generates a digital feedback voltage signal to maintain a substantially constant current on the secondary side using pulse width modulation (PWM) control when said reset time is lower than a first control value, and said digital feedback voltage signal representing the on-time for a subsequent switching cycle of the BJT switching device, said constant current controller generates a digital feedback voltage signal to maintain a substantially constant current on the secondary side using pulse frequency modulation (PFM) control when said reset time is not lower than said first control value, said digital feedback voltage signal representing the duration of said subsequent switching cycle of the BJT switching device.

10. The system of claim 9, wherein said first control value is determined based upon a duration of the switching cycle and a rated voltage of operation of the power supply.

11. The system of claim 9, wherein said pulse frequency modulation (PFM) control prevents an audible sound during the switching cycle of the BJT switching device.

12. The system of claim 9, wherein the output current limit is insensitive to variation in the inductance-input voltage ratio.

* * * * *